Aug. 30, 1927.
F. C. ARMSTRONG
1,640,435
SIGHTING INSTRUMENT FOR MEASURING ANGLES
Filed April 17, 1923
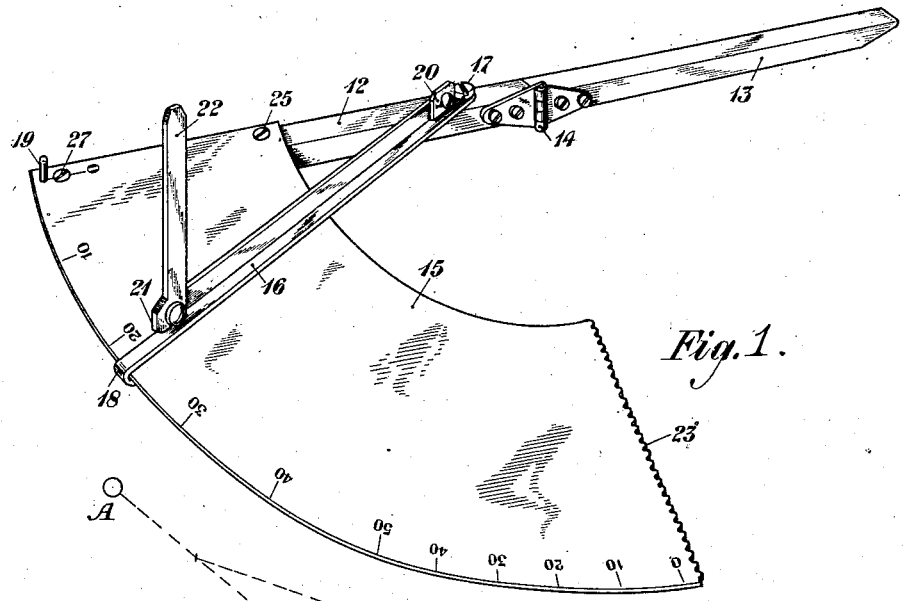
Fig. 1.
Fig. 4.
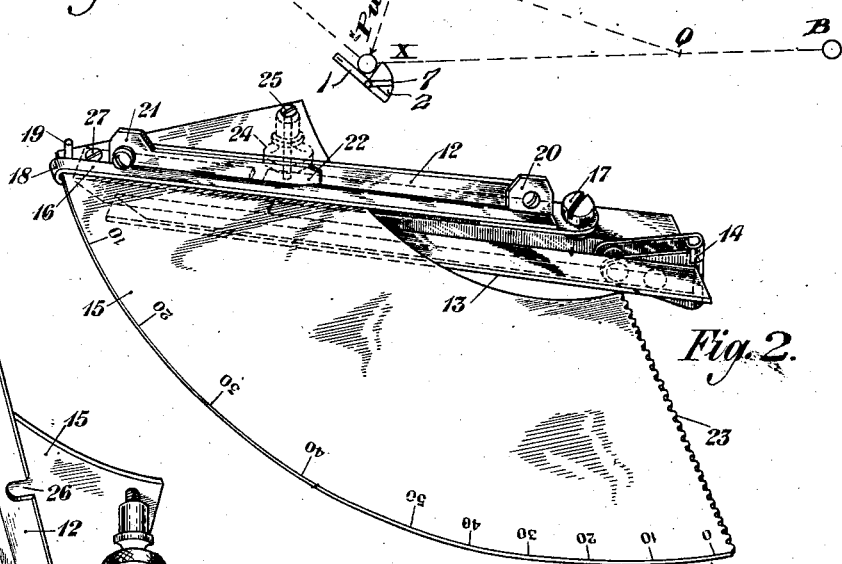
Fig. 2.
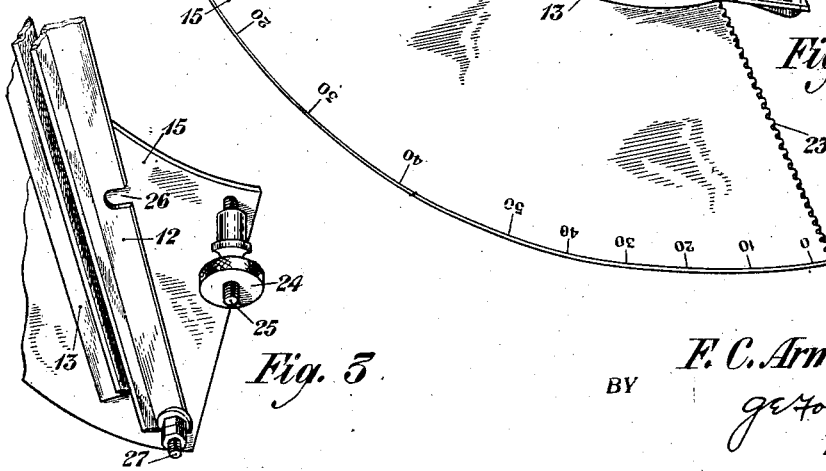
Fig. 3.
INVENTOR
F. C. Armstrong
BY
ATTORNEY Patented Aug. 30, 1927.

1,640,435

UNITED STATES PATENT OFFICE.

FRANK C. ARMSTRONG, OF LITTLE NECK, NEW YORK, ASSIGNOR TO AMERICAN TELEPHONE AND TELEGRAPH COMPANY, A CORPORATION OF NEW YORK.

SIGHTING INSTRUMENT FOR MEASURING ANGLES.

Application filed April 17, 1923. Serial No. 632,742.

This invention relates to instruments for use in finding certain horizontal measurements, and more particularly to instruments for finding the "pull", a distance to be found in connection with the guying of corner poles carrying electric wires or cables.

In determining the size of the guy or guys required for these corner poles, it is necessary to find, among several measurements, the distance known as the "pull". Suppose X (see Fig. 4 of the drawing) to be the corner pole, A the next pole in one direction, and B the next pole in the other direction. According to the standard practice, a point (which may be called P) one hundred feet from X on the line XA is determined, and likewise a second point (which may be called Q) one hundred feet from X on the line XB is determined. These two points P and Q are joined by a straight line, and a perpendicular is dropped from X to the line PQ. This perpendicular distance is known as the "pull".

The principal object of applicant's invention is to provide an instrument which will eliminate the necessity of making the measusements referred to above, thus effecting a great saving of time and labor. Other advantages of the invention will be disclosed in the detailed description given below.

Applicant's device, which may be called a "pull finder", is operated by one man, who is not called upon to make any substantial move during the operation. The instrument consists essentially of a fixed arm, a movable arm pivotally attached to the fixed arm, and a calibrated scale over which the movable arm slides. The operator, standing at the corner pole, X (as above, with reference to Fig. 4 of the drawing), by a sighting, places the fixed arm in line with the poles X and A. He then pivots the movable arm until it stands in line with the poles X and B. As will be made clear by consideration of the location of the pivotal point and the direction of the sightings, the angle between the arms is supplementary to the corner angle. Since the "pull" is controlled by the size of the angle formed by the lines XA and XB and since this angle and the angle between the arms are supplementary, the scale connected with the fixed arm of the instrument can be calibrated so as to give a reading in feet. Thus the movable arm, when it rests in line with the poles X and B, will indicate on the scale the number of feet of "pull"—the distance required.

The construction of applicant's instrument will be more clearly understood after an examination of the following detailed description of one desirable embodiment of the invention. This description serves merely to illustrate the invention, the scope of which is determined by the appended claim. There will be added to the detailed description of this form of the instrument a detailed description of its operation.

The following description is to be read in connection with the accompanying drawing. Fig. 1 of the drawing shows a perspective view of the instrument in its operative position; Fig. 2 shows a perspective view of the instrument in its folded position; Fig. 3 shows in perspective a detail, and Fig. 4 shows diagrammatically the position of the three poles with the instrument in the proper position for taking the reading, the size of the instrument being exaggerated for the sake of clarity. Like numerals of reference in the several figures of the drawing designate corresponding parts of the device.

With reference to Figs. 1, 2 and 3 of the drawing, the fixed arm is composed of two sections 12 and 13, hinged at 14. The "quadrant" 15 is partially cut away at the center. 16 is the movable arm, pivoted to the section 12 of the fixed arm at 17, the center of the quadrant. This movable arm carries an extension 18 which furnishes a convenient means for moving the arm. 19 is a sight for use in lining up the fixed arm. The movable arm 16 carries an upwardly extending flange. To this flange, near the pivotal end, there is fixed a sight 20. At the free end of the arm, this flange carries a pivoted member. This member, when folded along the flange, presents a sight 21 of equal height with the sight 20, and, when upright, presents an extended sight 22, functioning in the same manner as the member 8 of Figs. 1 and 2. The plate 15 may carry teeth at 23, to enable the operator to fix the instrument firmly against the corner pole. The nut 24, traveling on the screw 25, holds the plate 15 in temporarily fixed relation with section 12 of the fixed arm, the screw fitting into the notch 26 of the arm section 12. When the instrument is folded, the nut 24 is loosened, releasing the plate 15, which pivots on the rivet 27 and folds to the position shown in Fig. 4. Also the arm section 13 folds back against the section 12, lying below the plate 15, as indicated by broken lines in Fig. 4. Fig. 3 shows clearly the screw 25, the nut 24 and the notch 26. As indicated above, when the instrument is in its operative position, the screw 25 fits into the notch 26, and the nut 24 is tightened, holding the arm section 12 and the plate 15 in temporarily fixed relation.

With the instrument in its operative position, the scale is so calibrated that when the movable arm lies parallel to the fixed arm the reading indicated by the edge of the movable arm is zero, indicating a "pull" of zero feet corresponding to a straight angle at the "corner". It is understood that as the angle between the two pole lines which meet at the corner becomes smaller—that is, as the corner becomes sharper—the "pull" measured in feet becomes greater. The scale is graduated and calibrated so as to allow the true reading in feet of "pull" to be indicated by the movable arm in any position in which it may be placed by the sighting, this reading increasing as the corner angle becomes smaller and the supplementary angle between the arms of the instrument becomes greater.

The operation of the instrument is as follows (see Fig. 4): The operator, standing with his back toward the guy location, places the instrument against the corner pole with the scale end toward him. Looking along the fixed arm, he turns the instrument until he sights the side of the next pole to his left front. Holding the instrument firmly in this position, the operator then changes his position so as to be able to sight along the movable arm. He brings the movable arm into line with the next pole in the other direction to that in which he has previously sighted. The reading indicated on the scale by the movable arm represents the "pull" in feet on the corner pole.

It is obvious that the scale may be calibrated so as to render the instrument useful for purposes other than that of finding the "pull". For example, the instrument may be used as a bisector of the corner angle, in connection with the proper placing of the guy anchors or other fixing means.

What is claimed is:

An instrument of the class described comprising a calibrated scale, a fixed sighting arm composed of two sections, the first of said sections being pivoted to said scale at one point, and the second of said sections being hinged to the first, means for attaching said first section to said scale at a second point, and a movable sighting arm pivoted to said first section and slidable over said scale.

In testimony whereof, I save signed my name to this specification this 13th day of April, 1923.

FRANK C. ARMSTRONG.